US00RE50245E

(19) United States
(12) Reissued Patent
Abel et al.

(10) Patent Number: US RE50,245 E
(45) Date of Reissued Patent: Dec. 31, 2024

(54) CAMERA

(71) Applicant: The Chamberlain Group, LLC, Elmhurst, IL (US)

(72) Inventors: Jeremy Abel, West Dundee, IL (US); Corey Jevon Norman, Oak Park, IL (US)

(73) Assignee: THE CHAMBERLAIN GROUP LLC, Oak Brook, IL (US)

(21) Appl. No.: 29/901,769

(22) Filed: Sep. 5, 2023

Related U.S. Patent Documents

Reissue of:
(64) Patent No.: Des. 930,062
Issued: Sep. 7, 2021
Appl. No.: 29/770,549
Filed: Feb. 12, 2021

U.S. Applications:
(62) Division of application No. 29/707,052, filed on Sep. 25, 2019, now Pat. No. Des. 914,076.

(51) LOC (14) Cl. ..... 16-05
(52) U.S. Cl.
USPC ..... D16/219; D16/202
(58) Field of Classification Search
USPC ..... D16/200, 202, 203, 204, 205, 214, 218, D16/219
CPC ..... H04N 23/50; H04N 23/51; H04N 23/54; H04N 23/55; H04N 23/62; H04N 23/63
See application file for complete search history.

(56) References Cited

U.S. PATENT DOCUMENTS

| | | | |
|---|---|---|---|
| D193,590 | S | 9/1962 | Dreyfuss |
| D396,869 | S | 8/1998 | Yamakawa |
| D405,424 | S | 2/1999 | Winkler |
| D413,867 | S | 9/1999 | Mullet |
| D435,835 | S | 1/2001 | Steck |
| 6,377,173 | B1 | 4/2002 | Desai |
| D465,504 | S | 11/2002 | Van Klinken |
| 6,525,645 | B2 | 2/2003 | King |

(Continued)

FOREIGN PATENT DOCUMENTS

| | | |
|---|---|---|
| CN | 300871034 | 1/2009 |
| CN | 300971035 | 1/2009 |
| CN | 302123178 | 10/2012 |

OTHER PUBLICATIONS

Zmodo 720P HD Mini WiFi Smart Security Camera, published Dec. 10, 2015 (online), retrieved Sep. 12, 2023, https://www.Walmart.com/ip/Zmodo-720P-HD-Mini-WiFi-Smart-Security-Camera-Two-Way-Audio-Night-Vision/47368752, 13 pp.

*Primary Examiner* — Philip S Hyder
(74) *Attorney, Agent, or Firm* — Polson Intellectual Property Law P.C.; Margaret Polson

(57) CLAIM

The ornamental design for a camera, as shown and described.

DESCRIPTION

FIG. 1 is a front perspective view of a camera in accordance with our new design;
FIG. 2 is a rear perspective view thereof;
FIG. 3 is a front elevation view thereof;
FIG. 4 is a rear elevation view thereof;
FIG. 5 is a left side elevation view thereof;
FIG. 6 is a right side elevation view thereof;
FIG. 7 is a top plan view thereof; and,
FIG. 8 is a bottom plan view thereof.
The broken lines in the drawings depict portions of the camera that form no part of the claimed design.

1 Claim, 8 Drawing Sheets

Matter enclosed in heavy brackets [ ] appears in the original patent but forms no part of this reissue; matter printed in italics indicates the additions made by reissue.

(Amended)

(56) References Cited

U.S. PATENT DOCUMENTS

D474,221 S 5/2003 Cheng
D477,342 S 7/2003 Yeh
D478,605 S 8/2003 Guzman
D480,741 S 10/2003 Berger
D490,380 S 5/2004 Coullahan
D494,144 S 8/2004 Guzman
D495,303 S 8/2004 Coullahan
D496,674 S 9/2004 Hayashi
D508,899 S 8/2005 Suzuki
D516,443 S 3/2006 Gotou
D524,295 S 7/2006 Jacobson
D534,938 S 1/2007 Beasley
7,215,238 B2 5/2007 Buck
D546,295 S 7/2007 Marchetto
D546,296 S 7/2007 Marchetto
D547,275 S 7/2007 Bonnaud
D558,810 S 1/2008 Alden
D564,004 S 3/2008 Ikeda
D575,316 S 8/2008 Liu
D582,955 S 12/2008 Sekine
D589,497 S 3/2009 Andre
D592,158 S 5/2009 Peterson
D594,047 S 6/2009 Lee
D595,328 S 6/2009 Kim
D600,732 S 9/2009 Kim
D609,727 S 2/2010 Adolfsson
D613,626 S 4/2010 Wang
D614,145 S 4/2010 Arosio
D614,223 S 4/2010 Kim
D614,977 S 5/2010 Hollnagel
D617,944 S 5/2010 Hollnagel
D624,108 S 9/2010 Wang
D624,109 S 9/2010 Wang
D649,573 S 11/2011 Al
D651,633 S 1/2012 Park
8,157,457 B2 * 4/2012 Khamsepoor ..... G03B 17/04 396/428
D659,732 S 5/2012 Kim
D659,733 S 5/2012 Chen
D660,834 S 5/2012 Akana
D667,382 S 9/2012 Cosentino
D673,512 S 1/2013 Huang
D676,075 S 2/2013 Ku
D680,151 S 4/2013 Katori
D681,213 S 4/2013 Solby
D692,042 S 10/2013 Dawes
D692,939 S 11/2013 Huang
D693,868 S 11/2013 Ying
D697,119 S 1/2014 Park
D701,496 S 3/2014 Namminga
D711,359 S 8/2014 Marzynski
D715,228 S 10/2014 Lee
D721,754 S 1/2015 Chen ..... D16/202
D722,983 S 2/2015 Paredes
D725,049 S 3/2015 Paredes
D725,691 S 3/2015 De Rosa
D728,489 S 5/2015 Eriksen
D729,296 S 5/2015 Shelton
D730,421 S 5/2015 Huang
D730,423 S * 5/2015 Vandenbussche ..... D16/218
D732,512 S 6/2015 Fariello
D733,780 S 7/2015 Chen
D733,781 S 7/2015 Chen
D736,292 S 8/2015 Fengmin
D740,871 S 10/2015 Moon
D741,932 S 10/2015 Huang
D743,467 S 11/2015 Bhattacharya
D744,572 S 12/2015 Tabuchi
D746,889 S 1/2016 Moon
D747,384 S 1/2016 Scalisi
D747,756 S 1/2016 Scalisi
D748,709 S 2/2016 Jeong
D751,515 S 3/2016 Paredes
D751,617 S 3/2016 Sakigawara
D754,233 S 4/2016 Du
D755,274 S 5/2016 Lee
D764,559 S 8/2016 Luo
D776,180 S 1/2017 Fiedler
D782,926 S 4/2017 Hojo
D782,929 S 4/2017 Masahiro
D784,434 S 4/2017 Benedetti
D785,693 S 5/2017 Kim
D787,836 S 5/2017 Lee
D788,834 S 6/2017 Bhattacharya
D789,999 S * 6/2017 Yakabe ..... D16/200
D791,211 S 7/2017 Fujita
D794,694 S 8/2017 Liu
D795,329 S 8/2017 Martin
D795,938 S 8/2017 Ravat
D795,944 S * 8/2017 Mitchell ..... D16/203
D797,836 S 9/2017 Li
D798,360 S 9/2017 Jeong
D802,644 S 11/2017 Lee
D806,775 S 1/2018 Nguyen
D808,828 S 1/2018 Béhar
D809,045 S * 1/2018 Jou ..... D16/202
D813,289 S 3/2018 Laffon De Mazieres
D815,550 S 4/2018 Masuyama
D816,144 S 4/2018 Vigren
D818,028 S 5/2018 Ramones
D819,715 S 6/2018 Laurans
D820,339 S 6/2018 Yau
D824,982 S 8/2018 Lee
D828,425 S 9/2018 Piekarski
D828,426 S 9/2018 Li
D829,803 S 10/2018 Read
D830,446 S 10/2018 Muhlenkamp, IV
D831,089 S 10/2018 Laffon De Mazieres
D840,460 S 2/2019 Scalisi
D842,142 S 3/2019 Recker
D848,299 S 5/2019 Li
D849,077 S 5/2019 Tian
D849,088 S 5/2019 Lai
D849,089 S 5/2019 Lu
D849,109 S 5/2019 Tong
D859,498 S * 9/2019 Lin ..... D16/218
D863,406 S * 10/2019 Laffon de Mazieres .... D16/219
D865,840 S * 11/2019 White ..... D16/203
D871,481 S * 12/2019 Arens ..... D16/202
D881,974 S * 4/2020 Nguyen ..... D16/219
D885,457 S * 5/2020 Vozzi ..... D16/203
D892,896 S 8/2020 Gartrell
D892,898 S * 8/2020 Jacob ..... D16/203
D893,575 S 8/2020 Kyte ..... D16/202
D893,576 S * 8/2020 Kyte ..... D16/202
D896,298 S * 9/2020 Whaley ..... D16/219
D896,870 S * 9/2020 Li ..... D16/203
D897,400 S * 9/2020 Liu ..... D16/202
D897,403 S * 9/2020 Liu ..... D16/202
D898,098 S * 10/2020 White ..... D16/203
D907,090 S * 1/2021 Zheng ..... D16/202
D907,095 S * 1/2021 Hayes ..... D16/203
D907,681 S * 1/2021 Gartrell ..... D16/203
D909,451 S * 2/2021 Hamlin ..... D16/208
D912,121 S * 3/2021 Han ..... D16/203
D914,784 S * 3/2021 Wei ..... D16/203
D930,062 S 9/2021 Abel et al.
D941,076 S 1/2022 West et al.
D968,498 S * 11/2022 Zhang ..... D16/218
D974,443 S * 1/2023 Zheng ..... D16/202
D989,149 S * 6/2023 McManigal ..... D16/203
2006/0221206 A1 10/2006 Lin
2007/0292124 A1 12/2007 Gottwald
2009/0008521 A1 1/2009 Lee
2012/0120236 A1 5/2012 Xiao
2013/0063259 A1 3/2013 Kramer
2013/0176243 A1 7/2013 Bianrosa
2014/0150349 A1 6/2014 Yates
2015/0109441 A1 4/2015 Fujioka
2016/0112636 A1 4/2016 Yamaguchi
2017/0006340 A1 1/2017 Enke

(56) References Cited

U.S. PATENT DOCUMENTS

| | | | | |
|---|---|---|---|---|
| 2018/0240621 | A1 | 8/2018 | Oomori | |
| 2019/0089872 | A1* | 3/2019 | Rukes | G03B 17/08 |

* cited by examiner

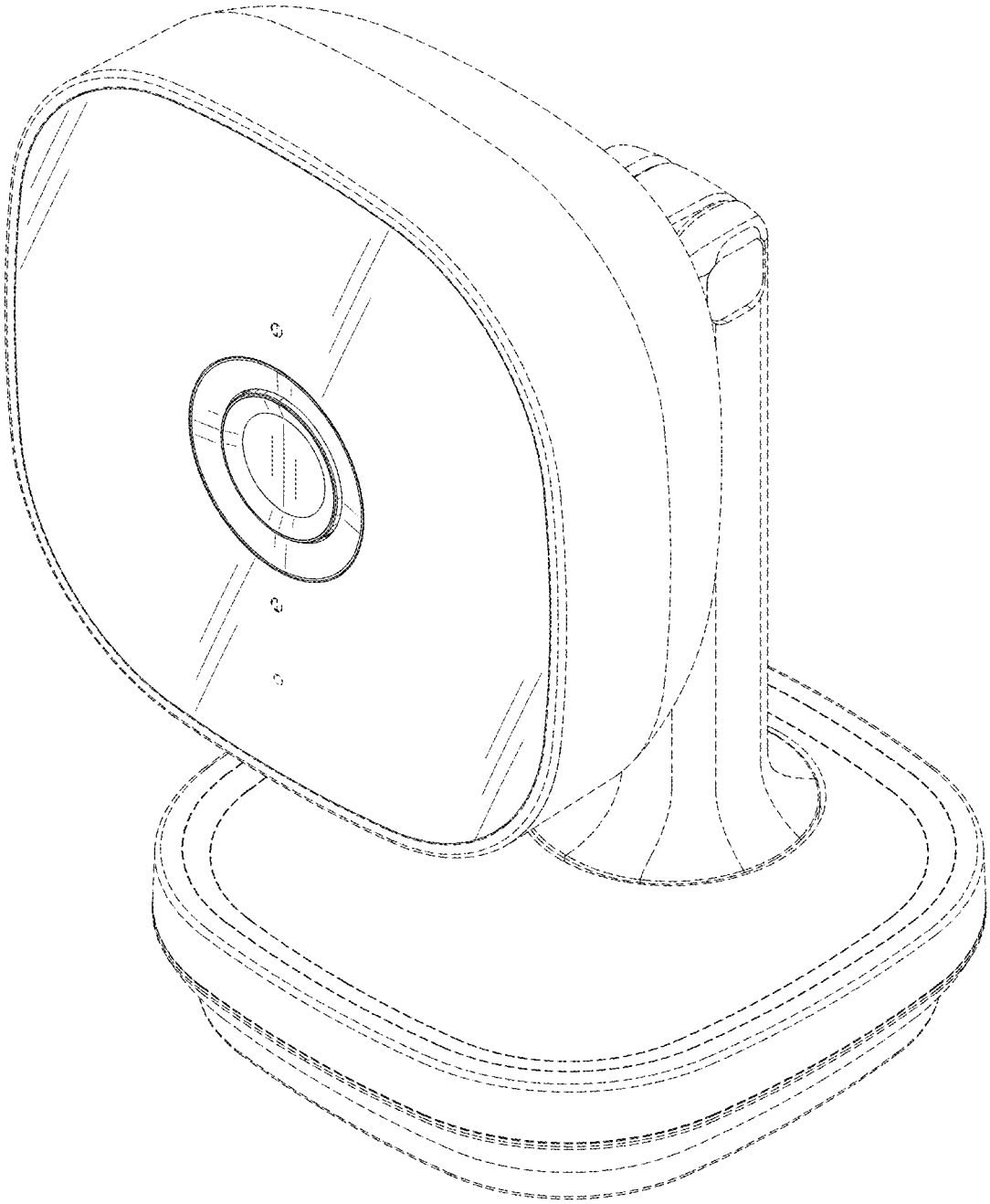
Fig. 1 (Amended)

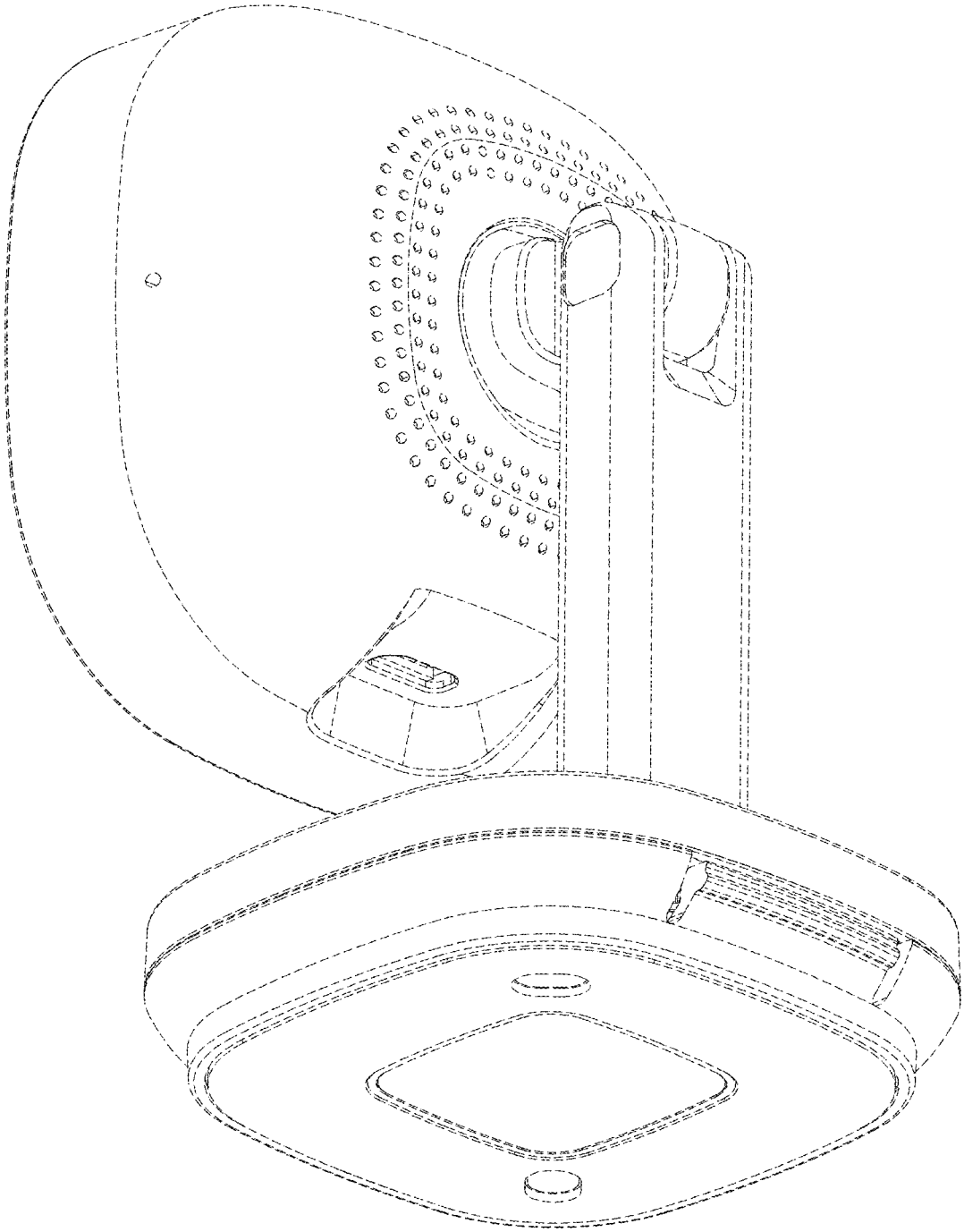
Fig. 2 (Amended)

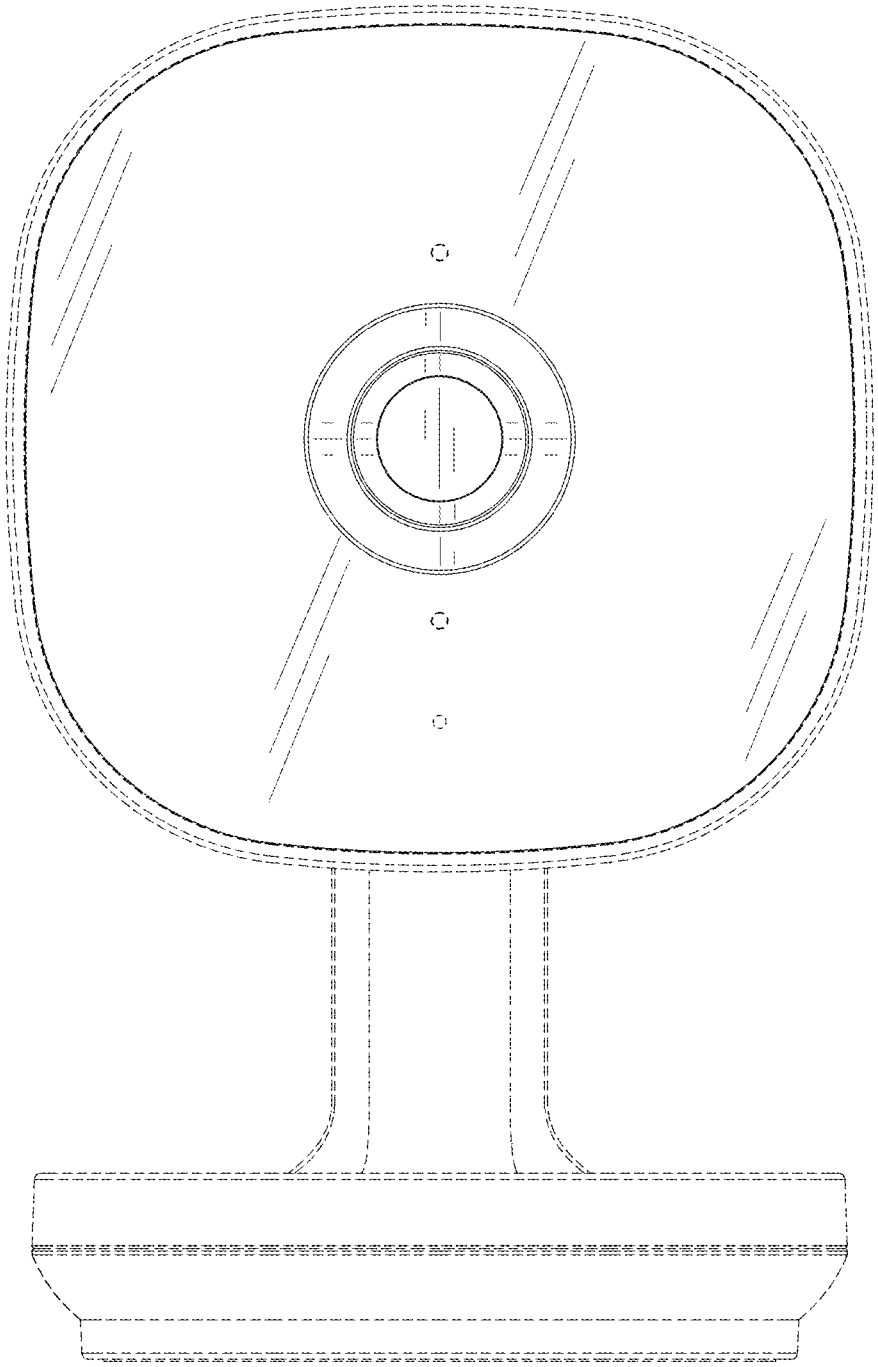
Fig. 3 (Amended)

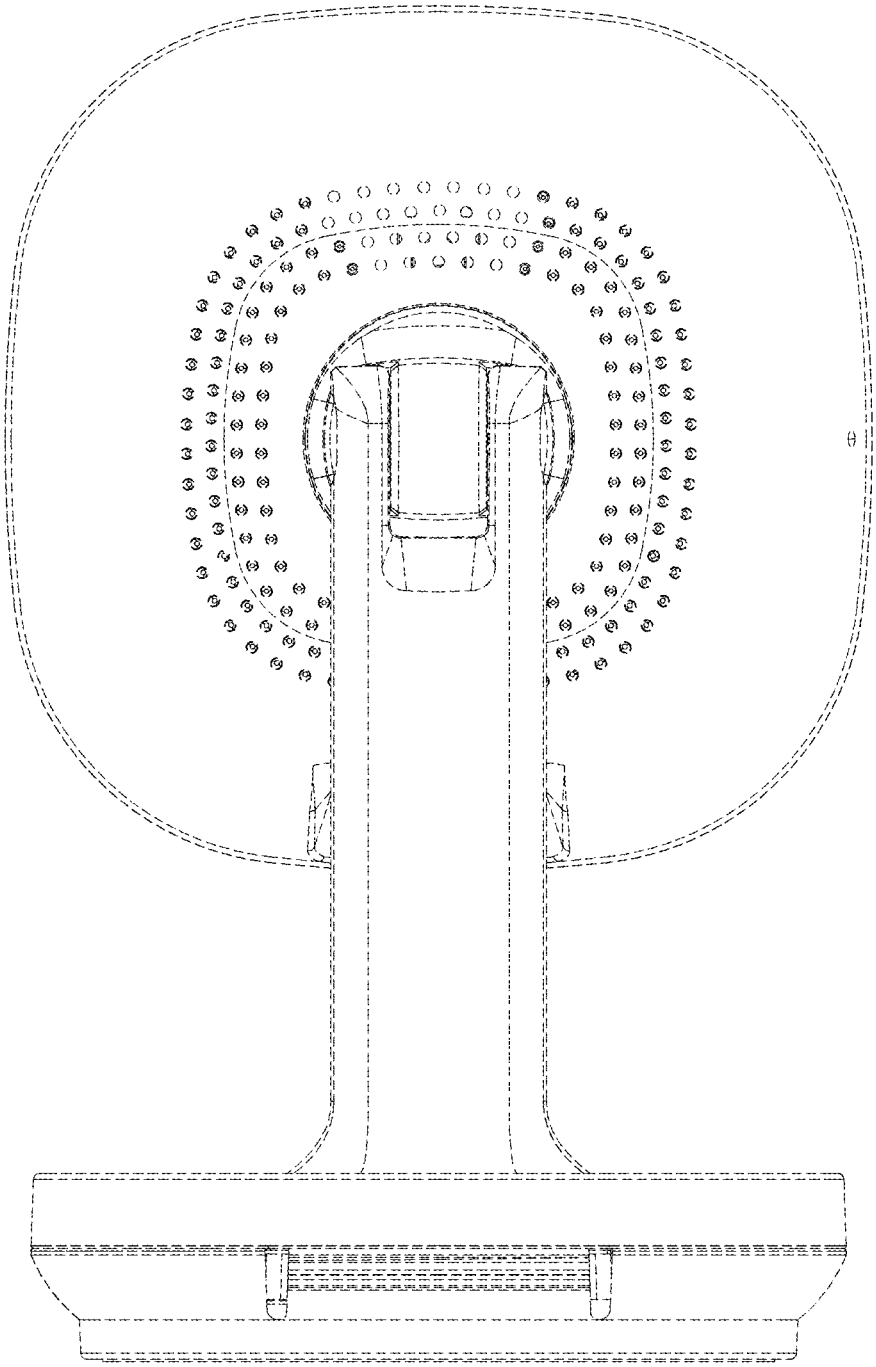
Fig. 4 (Amended)

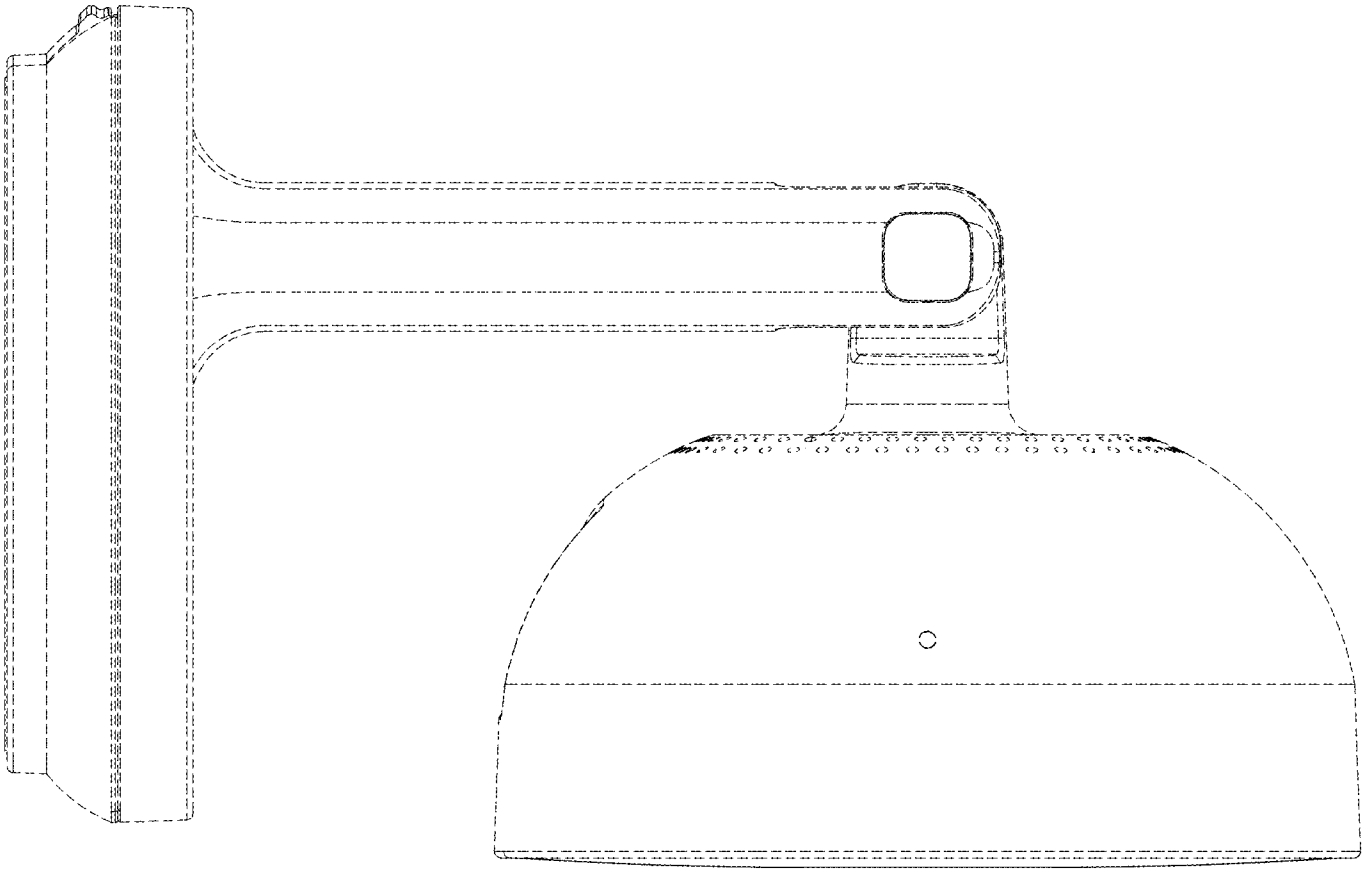
Fig. 5 (Amended)

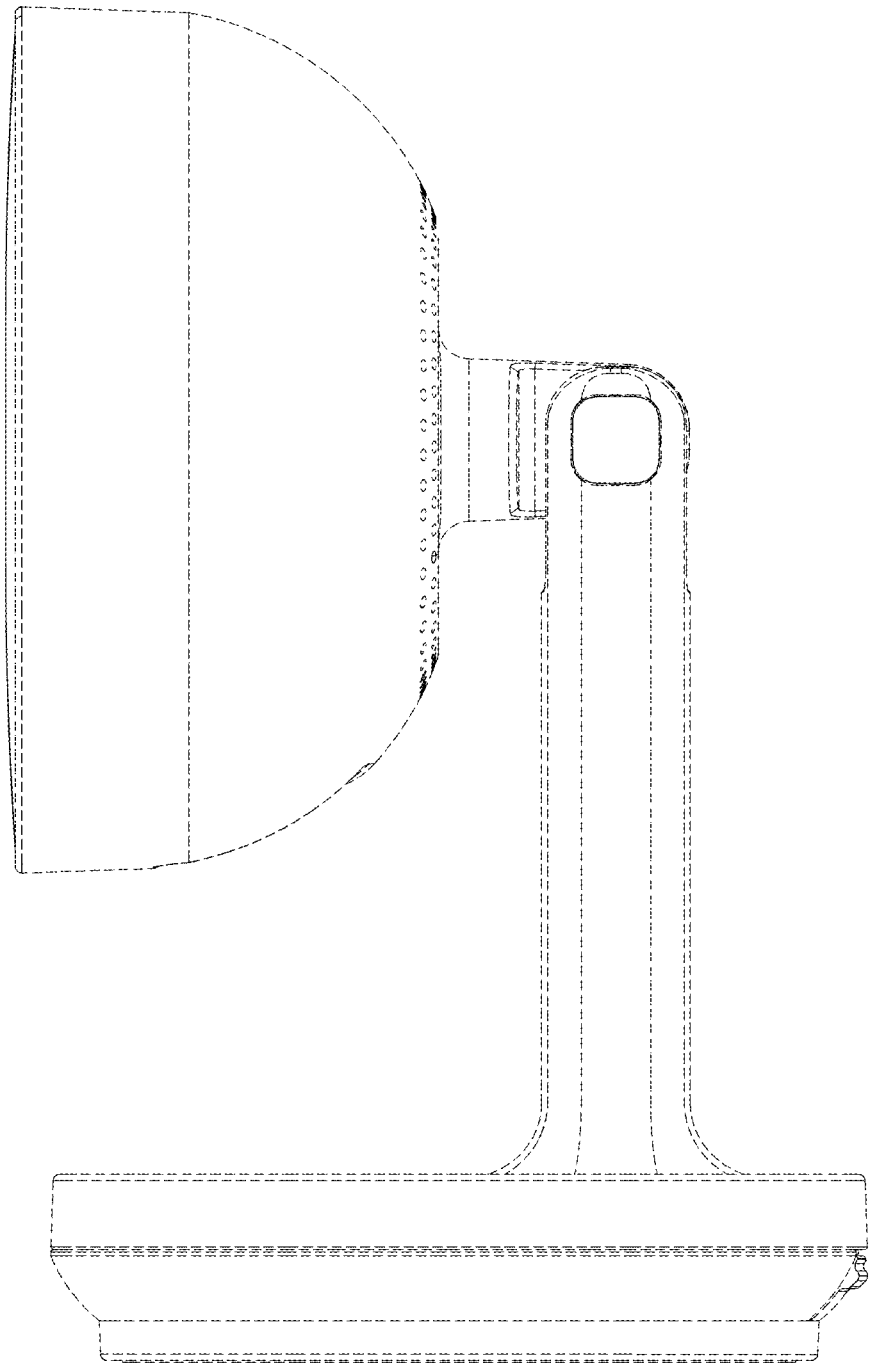
Fig. 6 (Amended)

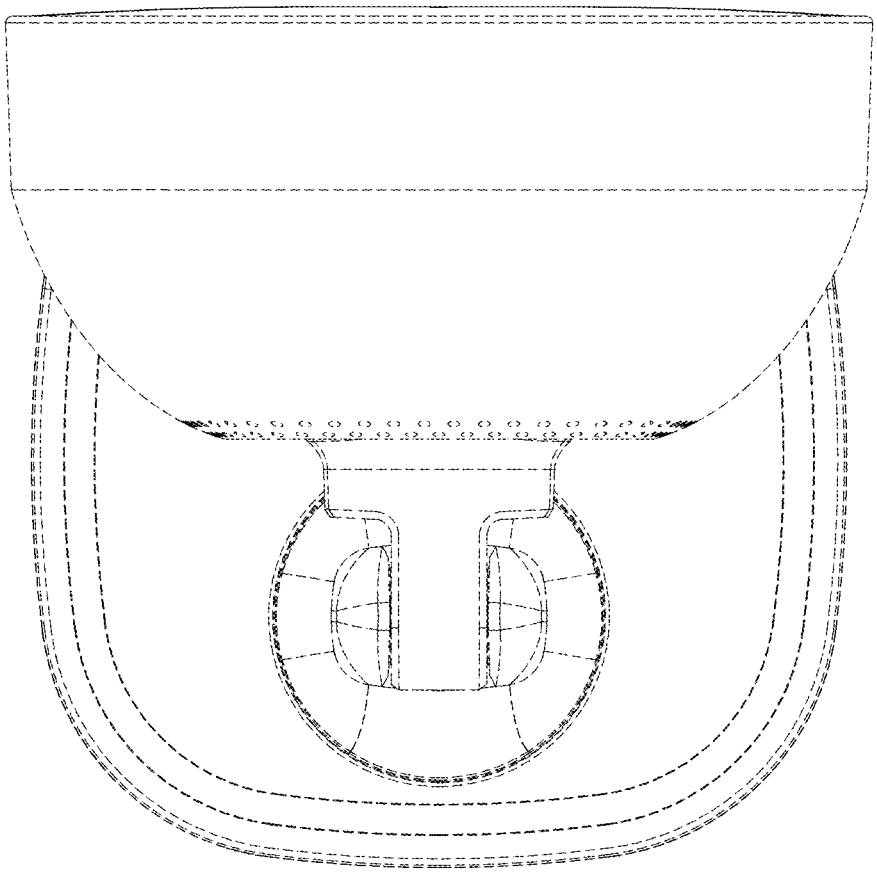
Fig. 7 (Amended)

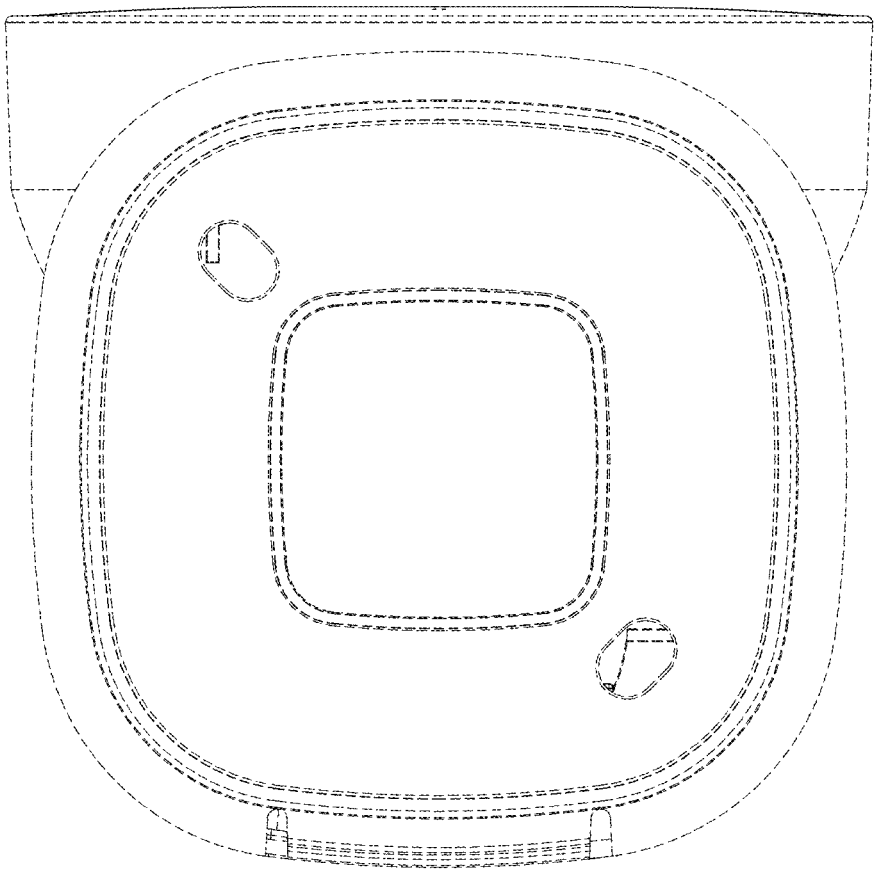
Fig. 8 (Amended)